US010933795B2

(12) United States Patent
Shelagowski et al.

(10) Patent No.: US 10,933,795 B2
(45) Date of Patent: Mar. 2, 2021

(54) INTERMODAL CONTAINER MOBILIZATION

(71) Applicant: Saginaw Products Corporation, Saginaw, MI (US)

(72) Inventors: Jeffrey Richard Shelagowski, Saginaw, MI (US); Timm Patrick Cappell, Hemlock, MI (US); Donald Joseph Mastromatteo, Saginaw, MI (US); Daniel Dennis Rutkowski, Saginaw, MI (US)

(73) Assignee: SAGINAW PRODUCTS CORPORATION, Saginaw, MI (US)

( * ) Notice: Subject to any disclaimer, the term of this patent is extended or adjusted under 35 U.S.C. 154(b) by 0 days.

(21) Appl. No.: 15/797,409

(22) Filed: Oct. 30, 2017

(65) Prior Publication Data
US 2018/0118542 A1 May 3, 2018

Related U.S. Application Data

(60) Provisional application No. 62/414,306, filed on Oct. 28, 2016.

(51) Int. Cl.
| | | |
|---|---|---|
| *B60P 3/40* | (2006.01) |
| *B62B 5/00* | (2006.01) |
| *B66F 9/065* | (2006.01) |
| *B64D 9/00* | (2006.01) |
| *B65D 90/00* | (2006.01) |
| *B66F 9/075* | (2006.01) |

(Continued)

(52) U.S. Cl.
CPC .............. *B60P 3/40* (2013.01); *B60P 7/132* (2013.01); *B62B 5/0086* (2013.01); *B64D 9/00* (2013.01); *B65D 90/0013* (2013.01); *B66F 9/065* (2013.01); *B66F 9/07568* (2013.01); *B66F 9/12* (2013.01); *B66F 9/22* (2013.01)

(58) Field of Classification Search
CPC .................................. B60P 3/40; B62B 5/0086
USPC ........................................... 414/458; 180/14.2
See application file for complete search history.

(56) References Cited

U.S. PATENT DOCUMENTS

| | | | | |
|---|---|---|---|---|
| 2,531,694 | A | * | 11/1950 | Larsen ...................... B60P 3/40 254/88 |
| 3,253,668 | A | * | 5/1966 | Tantlinger ............. B60P 1/6418 180/11 |

(Continued)

FOREIGN PATENT DOCUMENTS

| | | | | |
|---|---|---|---|---|
| EP | 2380772 A1 | * | 10/2011 | ................ B60P 3/40 |
| FR | 2647731 A2 | * | 12/1990 | ........... B62B 5/0083 |
| FR | 3006958 A1 | * | 12/2014 | ............. B60P 1/045 |

OTHER PUBLICATIONS http://www.cdkmobile.com/container%20aircraft%20loading%20full.htm[Oct. 27, 2016 10:48:57 AM]. 6 pages.
Trailer CaddyHD 48 Volt Extreme. DU Products, Inc. 2 pages.

*Primary Examiner* — James Keenan
(74) *Attorney, Agent, or Firm* — Reising Ethington P.C.

(57) ABSTRACT

An intermodal container mobilizer that includes a tow vehicle and forward and aft intermodal shipping container attachments. The forward container attachment is carried by the tow vehicle and connects to one end of an intermodal container. The aft container attachment is wheeled and connects to an opposite end of the intermodal container. The forward and aft attachments, together with the tow vehicle, support the intermodal container for rolling transport across a flat surface.

10 Claims, 14 Drawing Sheets

(51) Int. Cl.
  *B66F 9/12* (2006.01)
  *B60P 7/13* (2006.01)
  *B66F 9/22* (2006.01)

(56) References Cited

U.S. PATENT DOCUMENTS

| | | | | |
|---|---|---|---|---|
| 3,631,999 A * | 1/1972 | Walerowski | B60P 3/40 | 254/2 R |
| 3,795,336 A * | 3/1974 | Acker | B60P 1/6445 | 280/43.23 |
| 4,168,931 A * | 9/1979 | Harris | B60P 3/40 | 280/404 |
| 4,231,709 A * | 11/1980 | Corsetti | B60P 1/6445 | 280/404 |
| 4,297,068 A * | 10/1981 | Concha | B60P 1/6445 | 254/45 |
| 4,452,555 A * | 6/1984 | Calabro | B60P 1/6445 | 280/43.23 |
| 4,505,347 A * | 3/1985 | Prechtel | B60K 5/08 | 180/14.2 |
| 4,863,334 A * | 9/1989 | Girerd | B60P 1/6445 | 414/458 |
| 4,902,188 A * | 2/1990 | Page | B60P 1/025 | 296/61 |
| 5,006,031 A * | 4/1991 | Fossing | B60P 1/6445 | 280/35 |
| 5,145,307 A * | 9/1992 | Smethwick | B60P 1/6445 | 280/418.1 |
| 5,570,754 A * | 11/1996 | Stimson | A01B 51/026 | 180/167 |
| 5,800,114 A * | 9/1998 | Secondi | B66F 3/46 | 280/43.23 |
| 5,857,823 A * | 1/1999 | MacEachern | B60P 3/1033 | 280/414.1 |
| 6,821,066 B2 * | 11/2004 | Wehrli | B60P 3/40 | 410/32 |
| 6,830,422 B2 * | 12/2004 | Whitley | B60P 3/40 | 414/458 |
| 7,032,694 B2 * | 4/2006 | Jessen | A01D 69/00 | 180/11 |
| 7,275,907 B1 * | 10/2007 | Reichard | B60P 3/1033 | 180/14.2 |
| 8,646,753 B2 * | 2/2014 | Ross | B60P 1/6445 | 254/2 R |
| 9,511,702 B2 * | 12/2016 | Ross | B60P 3/40 | |
| 2003/0091417 A1 * | 5/2003 | Swann | B62B 5/0083 | 414/458 |
| 2008/0003088 A1 * | 1/2008 | Banta | B60P 3/40 | 414/460 |

* cited by examiner

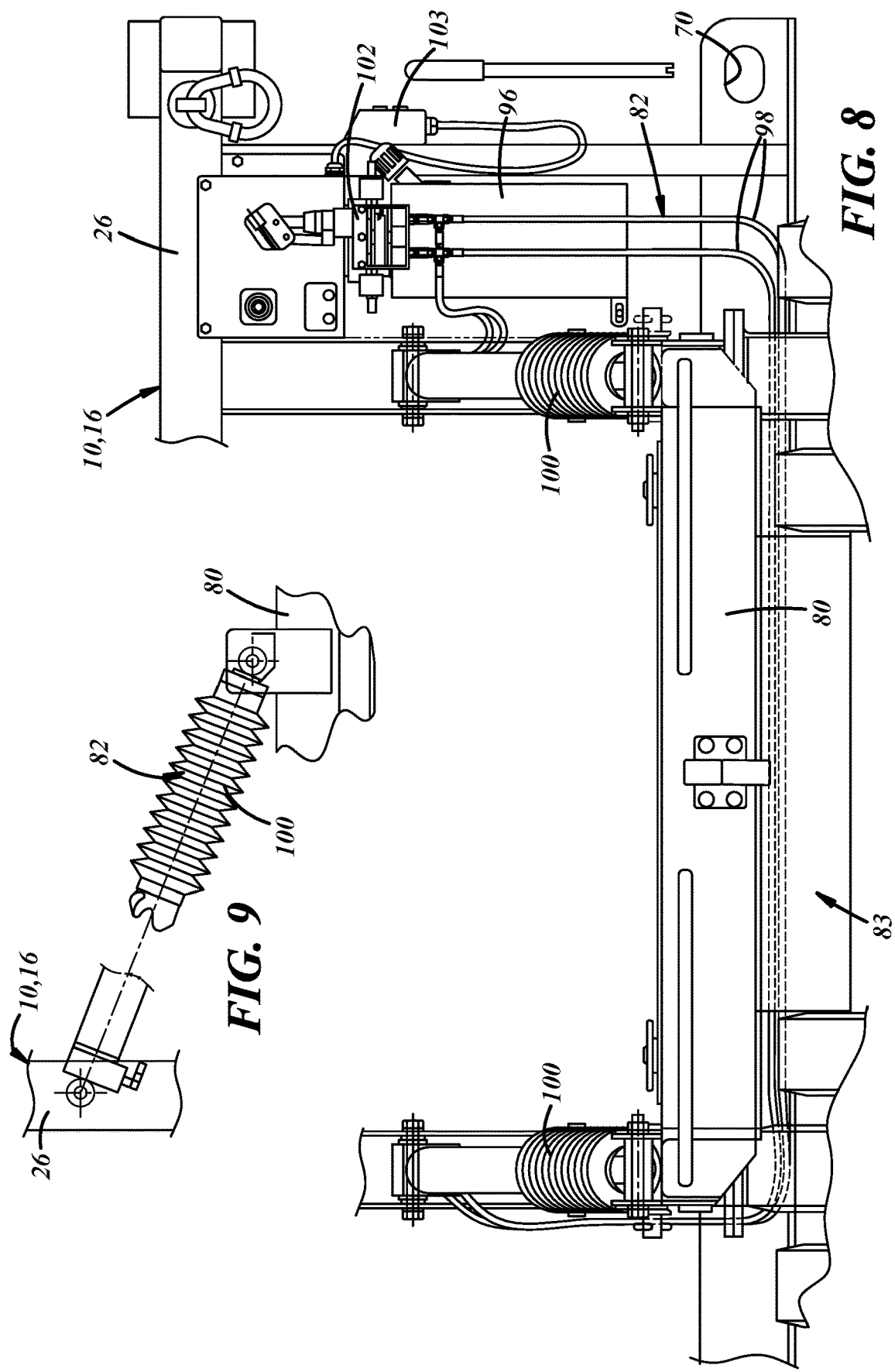

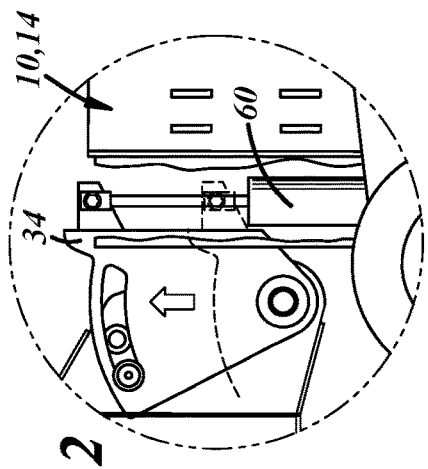
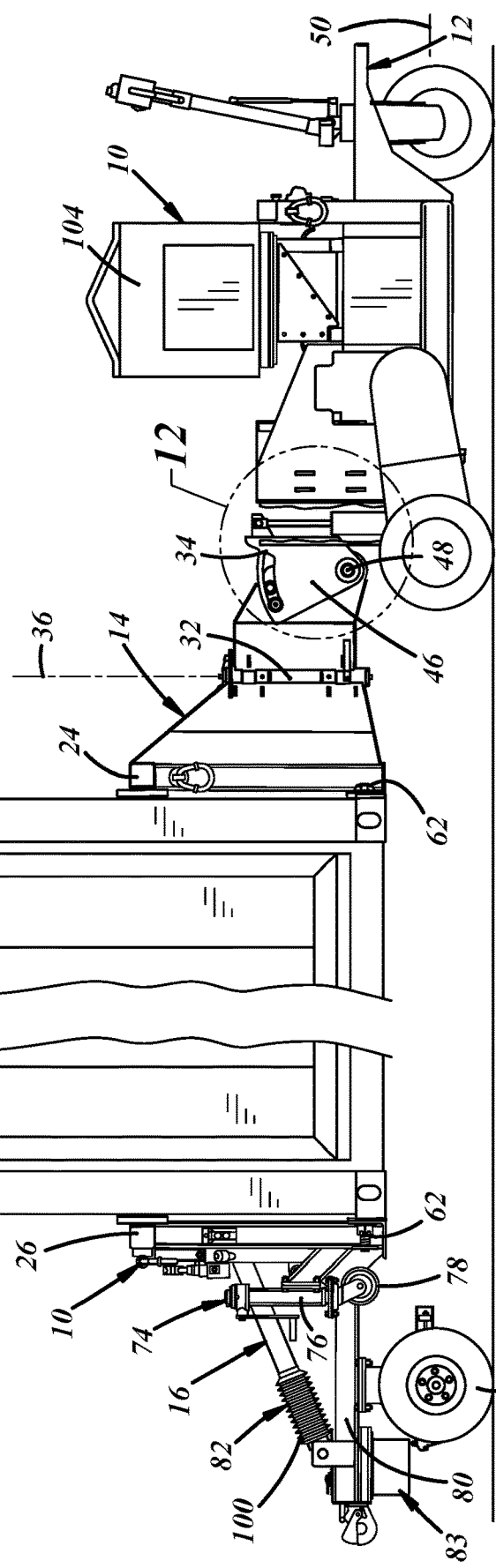
FIG. 12
FIG. 11

US 10,933,795 B2

INTERMODAL CONTAINER MOBILIZATION

CROSS-REFERENCES TO RELATED APPLICATIONS

This is a U.S. non-provisional patent application claiming the benefit of priority from U.S. provisional patent application No. 62/414,306 filed on Oct. 28, 2016, the entire contents of which are incorporated herein.

STATEMENT REGARDING FEDERALLY SPONSORED RESEARCH OR DEVELOPMENT

Not Applicable

BACKGROUND

Field

This application related generally to mobilization systems for onloading, offloading, and transport of intermodal shipping containers between primary transportation modes.

Description of Related Art Including Information Disclosed Under 37 CFR 1.97 and 1.98

Intermodal shipping containers are manufactured according to specifications established by the International Organization for Standardization (ISO) to ensure that they are suitable in size, shape, and construction for multiple primary transportation modes such as truck, rail, and ship. Intermodal container mobilizer systems are used for onloading and offloading of intermodal shipping containers and for transporting them over short distances between primary transport modes.

SUMMARY

An apparatus is provided for intermodal container mobilization. The apparatus may include a tow vehicle, a forward container attachment including a forward attachment frame connectable between the tow vehicle and a first end of an intermodal container, and an aft container attachment including an aft attachment frame connectable to a second end of an intermodal container. The aft attachment frame may also include a back wheel supported on the aft attachment frame for rotation about a back wheel rotational axis in a position to support the second end of an intermodal container for rolling transport across a flat surface.

Alternatively, the apparatus may include a forward container attachment including a forward attachment frame connectable between a tow vehicle and a first end of an intermodal container; and an aft container attachment including an aft attachment frame connectable to a second end of an intermodal container. According to this alternative, the aft container attachment may include a back wheel supported on the aft attachment frame for rotation about a back wheel rotational axis in a position to support the second end of an intermodal container for rolling transport across a surface.

In addition, a method is provided for mobilizing an intermodal container. The method may include connecting a forward container attachment between a hydraulic lift of a tow vehicle and a first end of an intermodal container to be mobilized, and connecting an aft attachment frame of an aft container attachment to a second end of the intermodal container to be mobilized, the aft container attachment including a back wheel supported for rotation about a back wheel rotational axis and resting on a surface across which the intermodal container is to be transported. The first end of the intermodal container may then be raised by actuating the hydraulic lift of the tow vehicle to lift the forward container attachment, and the second end of the intermodal container may be raised by actuating a hydraulic lift of the aft container attachment to lift the aft attachment frame of the aft container attachment. The tow vehicle may then be actuated to propel the forward container attachment, aft container attachment, and the supported intermodal container, across the surface.

DRAWING DESCRIPTIONS

These and other features and advantages will become apparent to those skilled in the art in connection with the following detailed description and drawings of one or more embodiments of the invention, in which:

FIG. 8 is a fragmentary back view of the aft container attachment of FIG. 7 showing electric and hydraulic components of the aft container attachment;

FIG. 9 is a fragmentary side view of a hydraulic cylinder of the aft container attachment of FIG. 7 connected between chassis and aft attachment frame components of the aft container attachment;

FIG. 11 is a side view of the intermodal container and container mobilizer apparatus of FIG. 10 showing the forward and aft attachment frames in respective raised positions supporting the intermodal container above the support surface for rolling transport;

FIG. 12 is a magnified side view of the region bounded by circle 12 in FIG. 11, and showing partial magnified views of pitch pivot and tow mount components of the forward container attachment of FIG. 11, and a hydraulic lift component of the tow vehicle of FIG. 11;

DETAILED DESCRIPTION

Figure 1:
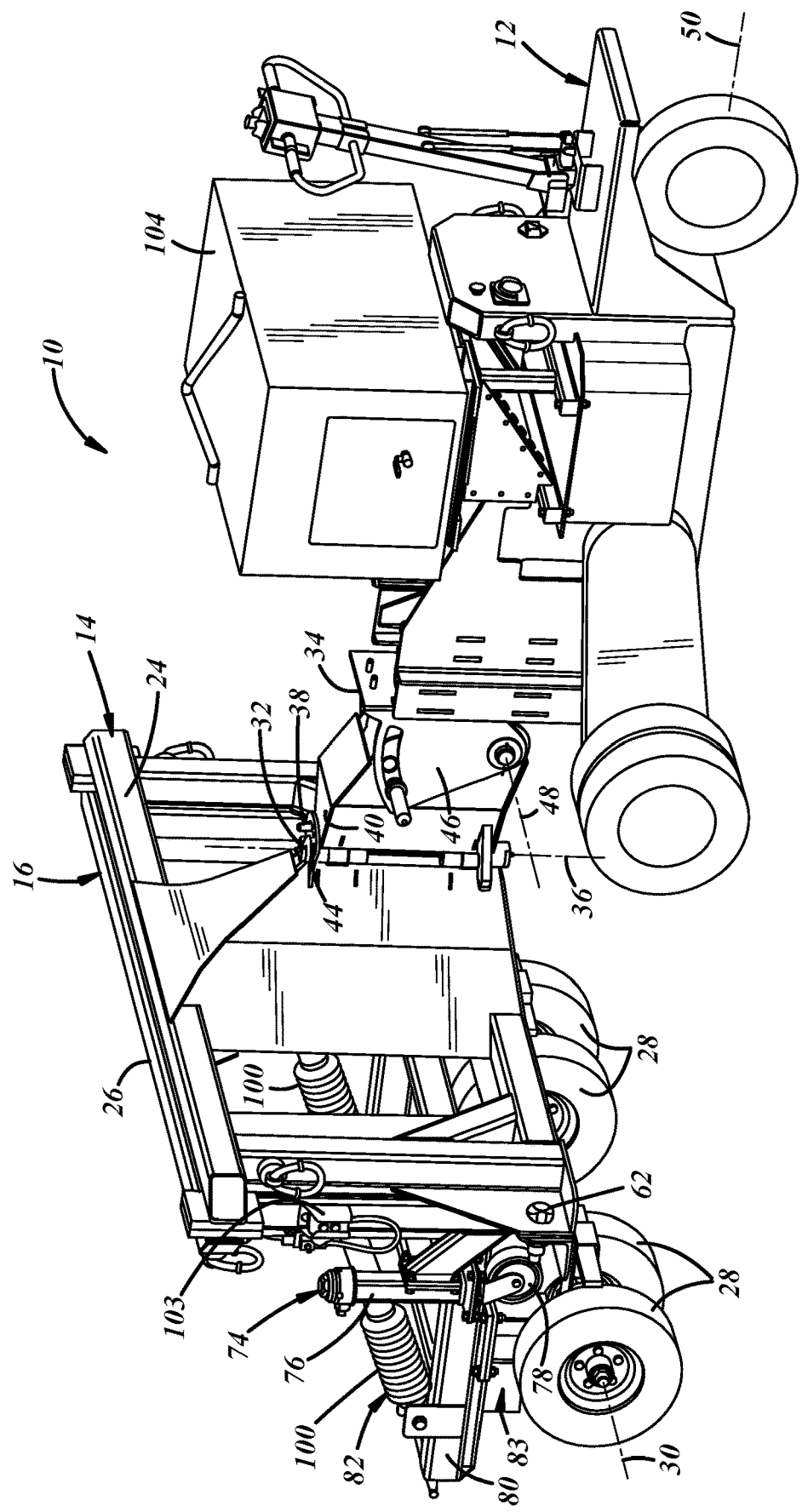
FIG. 1 is a perspective view of an intermodal container mobilizer apparatus.

An intermodal container mobilizer apparatus is generally shown at 10 in the appended drawings. As best shown in FIGS. 1-4, 10, and 11, the apparatus 10 may include a tow vehicle 12, a forward container attachment 14, and an aft container attachment 16. The tow vehicle 12 may be of any suitable type such as, for example, a tug available from DJ Products of Little Falls, Minn., under the product name TrailerCaddy® HD Extreme.

As shown in FIGS. 3, 4, 10, and 11, the forward and aft container attachments 14, 16 may be configured to removably attach to respective first and second opposite ends 18, 20 of a container 22, such as an intermodal shipping container. The container 22 may, for example, be an intermodal container manufactured according to specifications established by the International Organization for Standardization (ISO) and suitable for multiple transportation modes such as truck, rail, and/or ship.

As best shown in FIGS. 5, 6, 10, and 11, the forward container attachment 14 may be carried by the tow vehicle 12 and may include a forward attachment frame 24 connectable to a first end 18 of an intermodal container 22 in a position to support the first end 18 of the container 22 for rolling transport across a flat surface. As best shown in FIGS. 3, 4, 7, 10, & 11, the aft container attachment 16 may include an aft attachment frame 26 connectable to a second end 20 of the intermodal container 22, and may include four back wheels 28 supported on the aft container attachment 16 for rotation about a common back wheel rotational axis 30 in a position to support the second end 20 of an intermodal container 22 for rolling transport across a flat surface. This arrangement allows an intermodal container 22 to be moved across a flat surface without a large prime mover vehicle, such as a semi tractor and trailer arrangement, being needed to support the container 22 and provide motive power for the rolling transport of the container 22.

The back wheels 28 of the aft container attachment 16 may be fixed against pivotal motion about an axis normal to the rotational axis. Any suitable wheels or fixed, non-swiveling caster arrangements may be used, such as those available from Hamilton Caster under product designation R-7710-SPRT-DCB.

As best shown in FIGS. 1, 2, 5 & 6, the forward container attachment 14 may include a yaw pivot 32 connected between the forward attachment frame 24 and a tow mount 34 configured to be connectable to the tow vehicle 12. The yaw pivot 32 may be configured to allow lateral pivotal motion of the forward attachment frame 24 relative to the tow mount 34 and tow vehicle 12 about a generally vertically-oriented axis 36 of the yaw pivot 32 to improve steerability of the apparatus 10 with an intermodal container attached.

Figure 5:
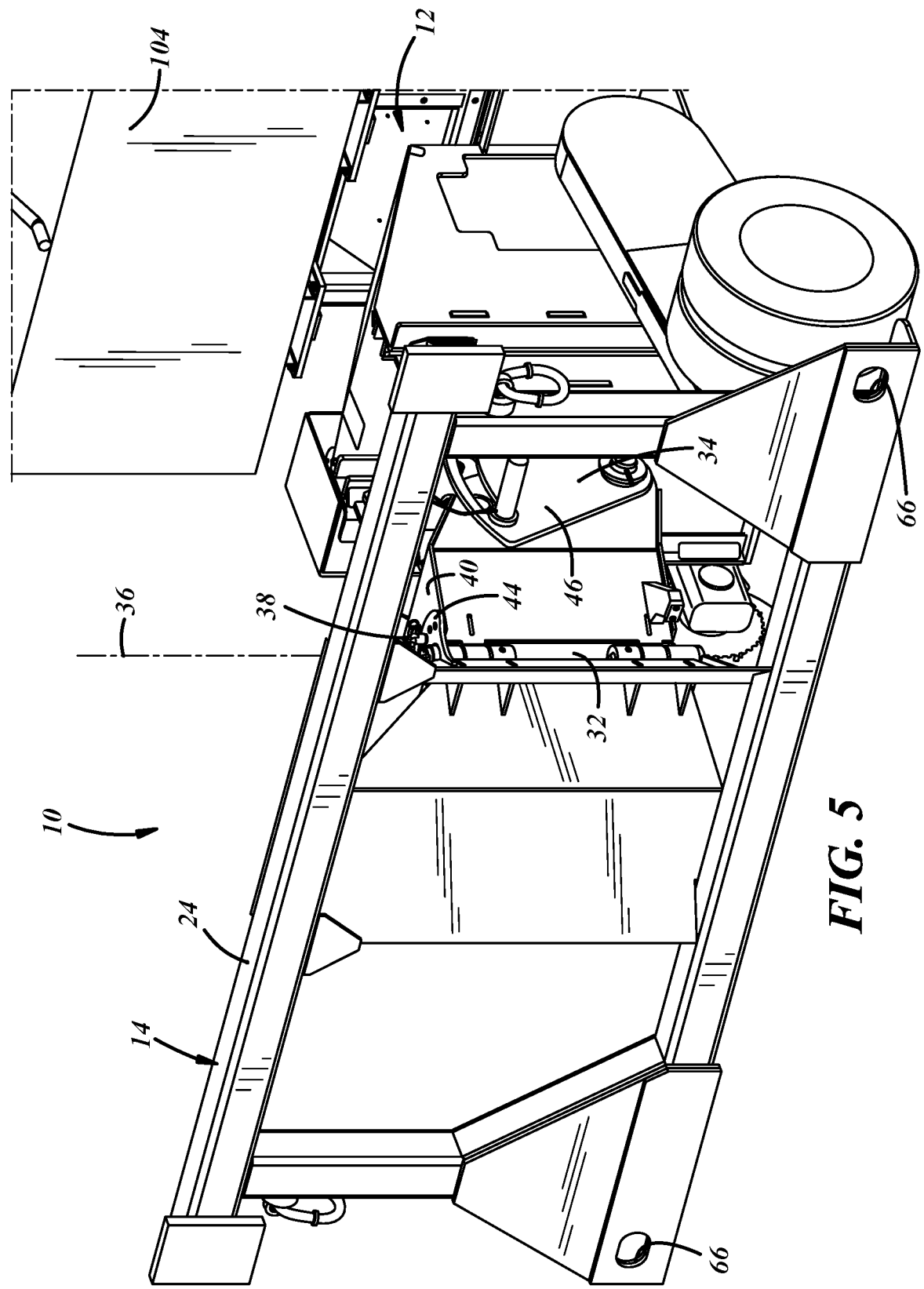
FIG. 5 is a magnified back perspective view of a portion of a forward container attachment of the apparatus of FIG. 1.
Figure 6:
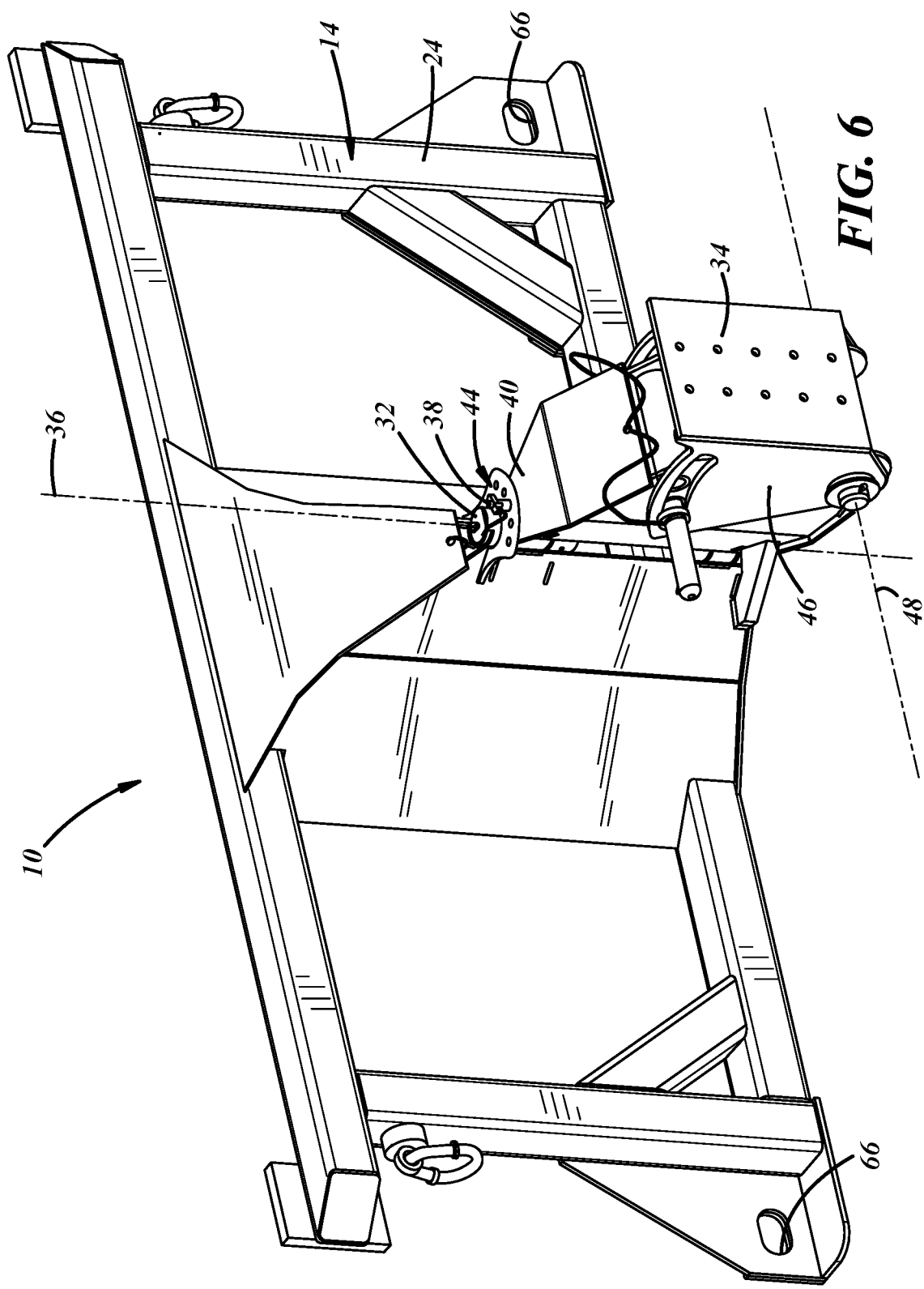
FIG. 6 is a front perspective view of a forward attachment frame, yaw pivot, pitch pivot, and tow mount locking bracket of the apparatus of FIG. 1.

As best shown in FIGS. 5 & 6, a removable locking pin 38 may be inserted through a hole formed in a tow mount locking bracket 40 fixed to the tow mount 34, and a corresponding hole formed in an attachment frame locking bracket 44 fixed to the forward attachment frame 24. Positioning the locking pin 36 in this manner secures the forward attachment frame 24 against pivotal yawing motion relative to the tow mount 34 and tow vehicle 12, to facilitate alignment and attachment of the forward attachment frame 24 to an intermodal container 22. Such alignment and attachment may be accomplished by backing the tow vehicle 12 into a position where the forward attachment frame 24 is properly positioned against a first end of an intermodal container 22 for attachment thereto.

Figure 4:
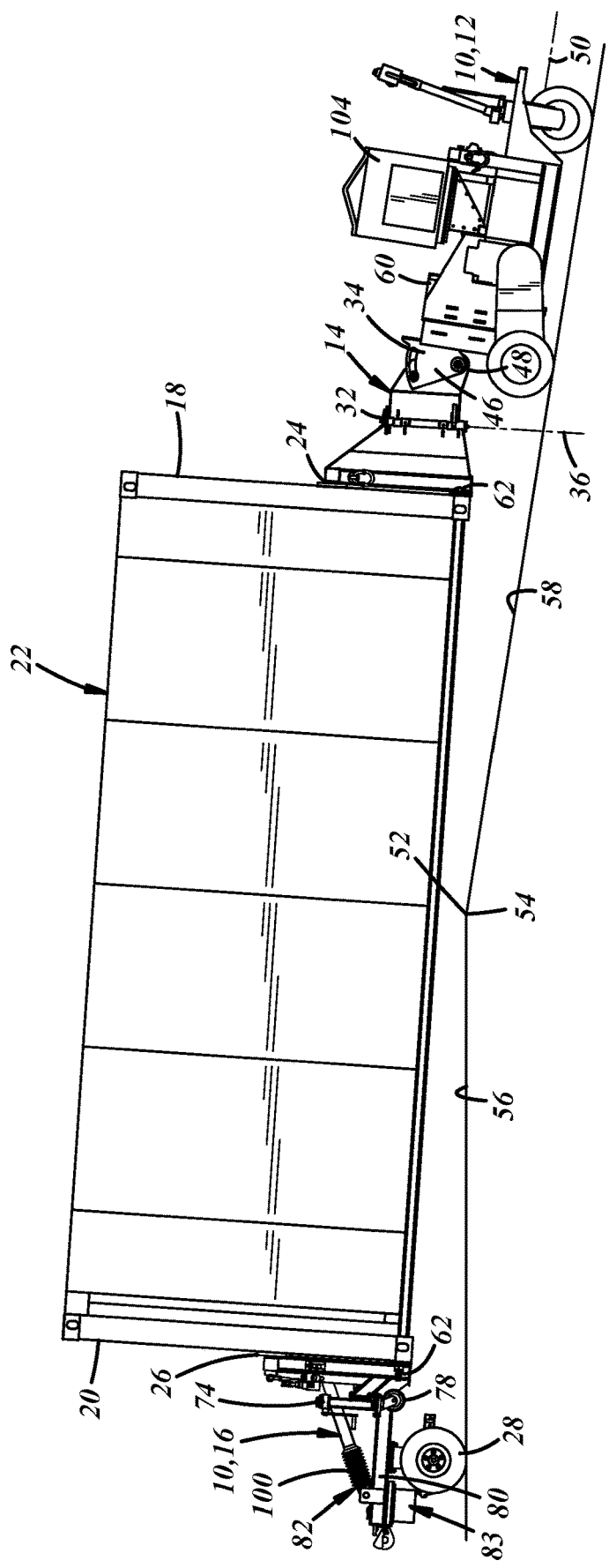
FIG. 4 is a side view of the intermodal container mobilizer of FIG. 1 supporting and providing rolling transport of an intermodal container over an outside corner formed at the intersection of two flat support surfaces.

As best shown in FIGS. 1, 2, 4-6, 11 & 12, the forward container attachment 14 may include a pitch pivot 46 that may be connected between the forward attachment frame 24 and the tow vehicle 12. The pitch pivot 46 may be configured to allow pivotal motion of the forward attachment frame 24 relative to the tow vehicle 12 about a generally horizontally-oriented axis 48 that is generally transverse to a longitudinal axis 50 of the tow vehicle 12. This allows for rolling transport of an intermodal shipping container 22 across either an inside corner or, as shown in FIG. 4, an outside corner 52 formed at the intersection 54 of two flat surfaces 56, 58 oriented in different attitudes from one another.

The pitch pivot 46 may have a pivotal range of motion sufficient to allow the apparatus 10 to roll an ISO-standard sized intermodal container 22 across an inside corner formed where the aft cargo ramp of a C-17 aircraft meets a generally level ground surface. The pivotal range of the pitch pivot may also be sufficient to allow the apparatus 10 to roll an intermodal container 22 across an outside corner formed where the aft cargo ramp meets a cargo deck of the C-17 aircraft.

As best shown in FIGS. 11 & 12, the forward container attachment 14 may be configured to connect to and be supported on a motorized hydraulic lift 60 of the tow vehicle 12. This allows an operator to alternately raise and lower the forward container attachment 14 and, thus, the first end 18 of an attached intermodal container 22, via actuation of the motorized hydraulic lift 60 of the tow vehicle 12.

Figure 10:
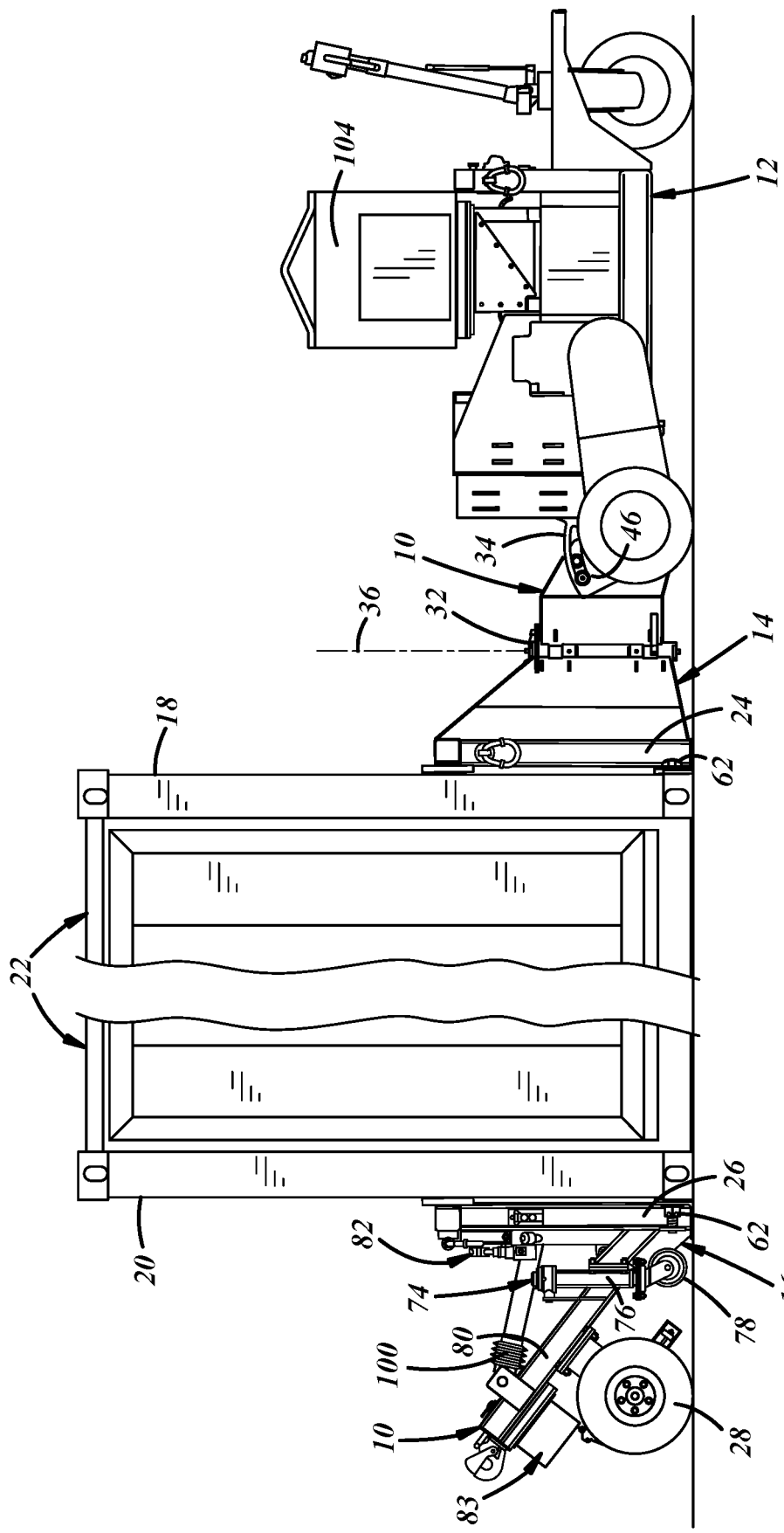
FIG. 10 is a side view of the intermodal container mobilizer apparatus of FIG. 1 showing forward and aft attachment frames of the apparatus in respective lowered positions and connected to opposite ends of an intermodal container resting on a support surface.
Figure 13:
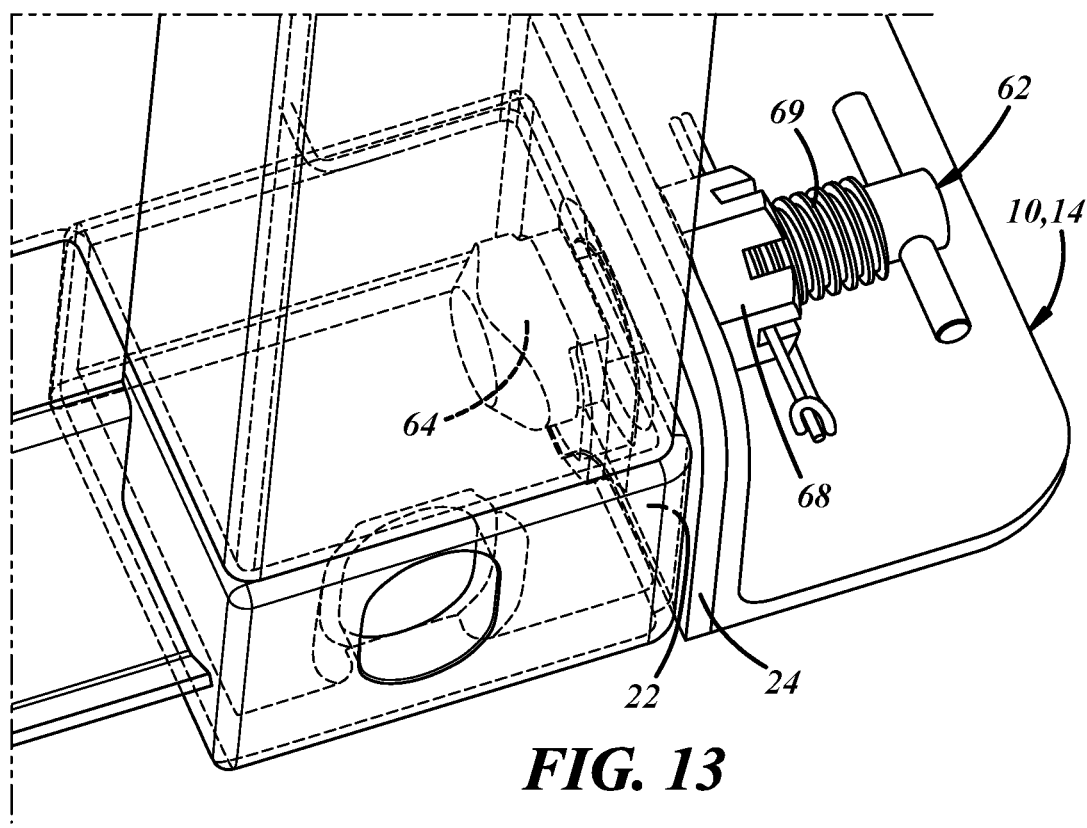
FIG. 13 is a partial perspective view of a twist lock pin of the apparatus of FIG. 1 connecting a lower starboard corner of the forward attachment frame of the apparatus of FIG. 1 to an intermodal container.

As shown in FIGS. 1-4, 10, 11, and 13, the apparatus 10 may include twist lock pins 62 having respective oblong heads 64 removably insertable through and twistable into engagement with oblong pin receiver holes 66 in the forward attachment frame 24 and correspondingly-positioned and shaped oblong pin receiver holes formed in the first end 18 of an intermodal container 22 in accordance with ISO standards. Once inserted through the receiver holes 66, the lock pins 62 are twisted approximately 90 degrees into respective engaged positions in which the lock pin heads 64 are positioned to prevent axial extraction. As best shown in FIG. 13, a castle nut 68 may then be threaded onto a threaded shaft 69 of each lock pin into a position securing the forward attachment frame 24 against the first end 18 intermodal container 22, and pinned in place. The twist lock pins 62 may, in the same manner, be used to connect the aft attachment frame 26 to a second end 20 of an intermodal container 22 as shown in FIGS. 4, 10, and 11.

Figure 2:
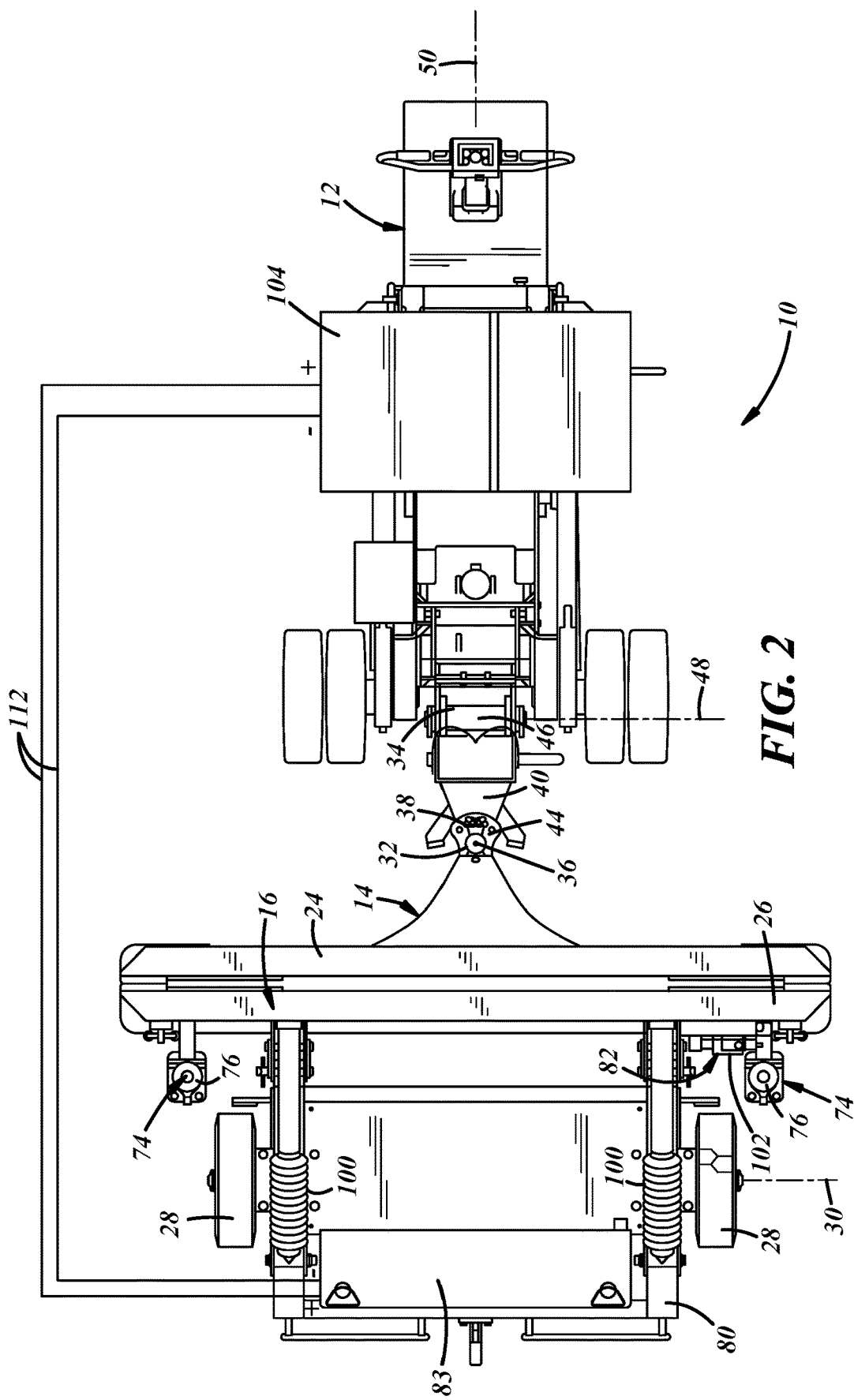
FIG. 2 is a top view of the intermodal container mobilizer apparatus of FIG. 1 with power cables shown connecting an optional generator to an electrical system of an aft container attachment of the apparatus.
Figure 3:
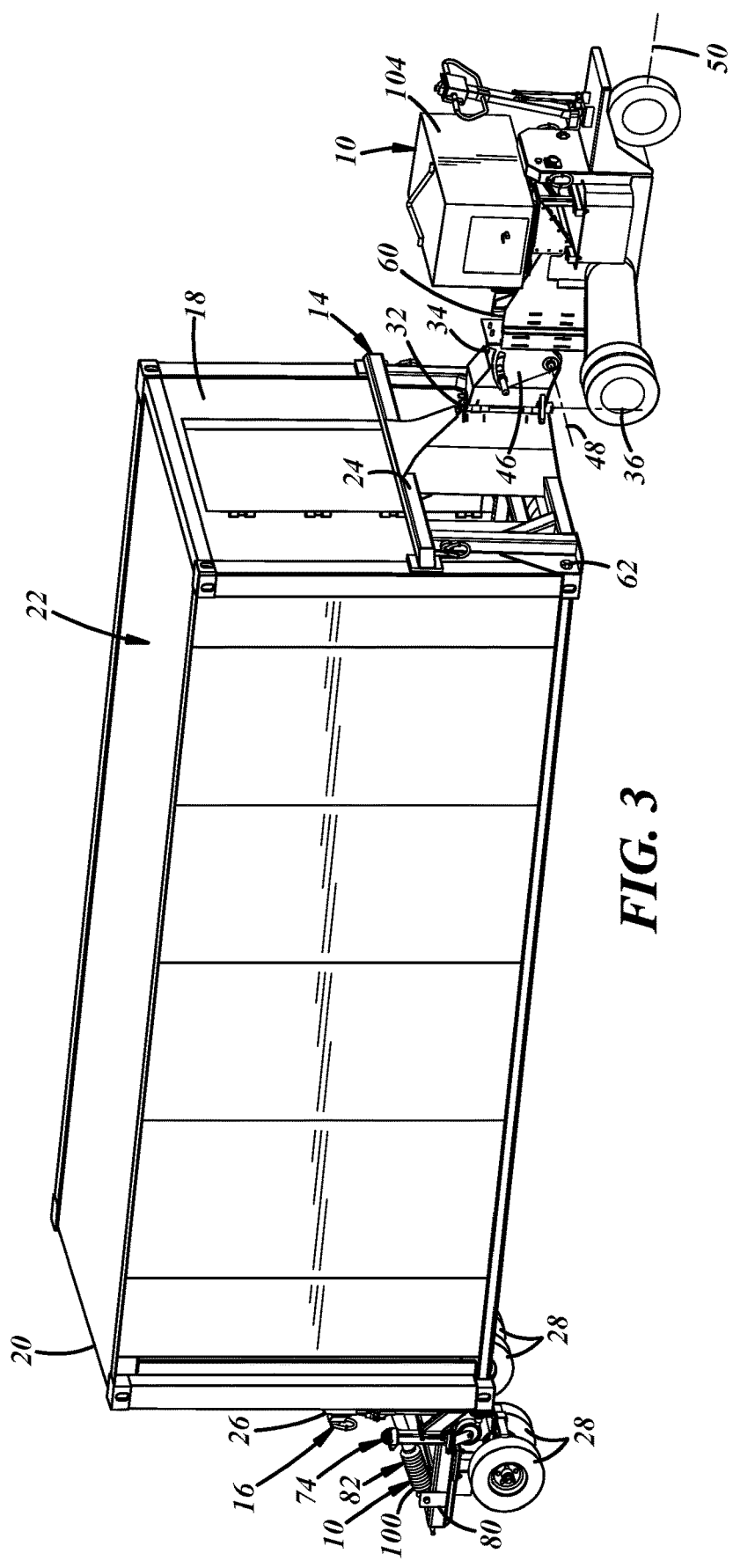
FIG. 3 is a perspective view of the intermodal container mobilizer apparatus of FIG. 1 supporting an intermodal container for rolling transport.

As shown in FIGS. 1 and 2, the aft attachment frame 26 may be connectable to the forward attachment frame 24 for rolling transport of the forward and aft container attachments 14, 16 with the tow vehicle 12 connected to the forward container attachment 14. The forward and aft attachment frames 24, 26 may be connected together by first aligning the pin receiver holes 66 of the forward attachment frame 24 with those 70 of the aft attachment frame 26, and then inserting twist lock pins 62 through the pin receiver holes 66, 70 and locking together the forward and aft frames 24, 26 by twisting the lock pins 62 into engagement.

Figure 7:
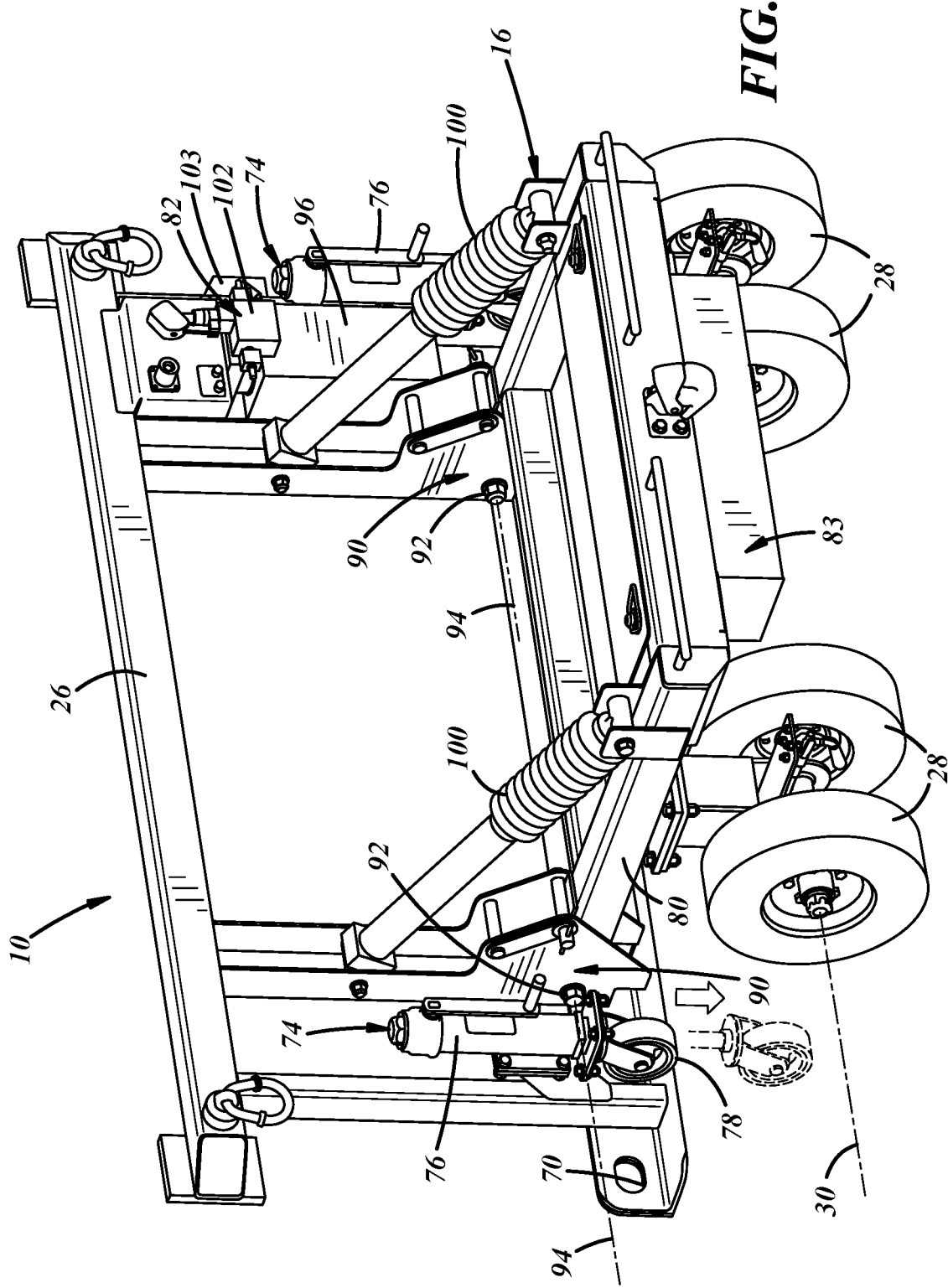
FIG. 7 is a back perspective view of an aft container attachment of the apparatus of FIG. 1.

As shown in FIGS. 1-4, 7, 10, and 11, the aft container attachment 16 may include two caster jacks 74 carried by the aft attachment frame 26 in respective positions spaced forward of the back wheel rotational axis 30. As best shown in FIG. 7, each caster jack 74 may comprise a jack 76 that is carried by the aft attachment frame 26 and that supports a caster wheel 78 for swiveling motion about a generally vertical swivel axis. The jack 76 may also be actuable to move the caster wheel 78 between a retracted up position for rolling transport when the aft container attachment 16 is attached to either the forward container attachment 14 or an intermodal container 22, and an extended down position for rolling transport of the aft container attachment 16 when not attached to either the forward container attachment 14 or an intermodal container 22.

The aft container attachment 16 may comprise an aft attachment chassis 80 supported on the back wheels 28 and carrying the aft attachment frame 26. As best shown in FIGS. 7-9, the aft container attachment 16 may also include a motorized hydraulic lift 82 actuable to alternately raise and lower the aft attachment frame 26 and the second end 20 of an attached intermodal container 22 relative to the back wheels 28.

Figure 15:
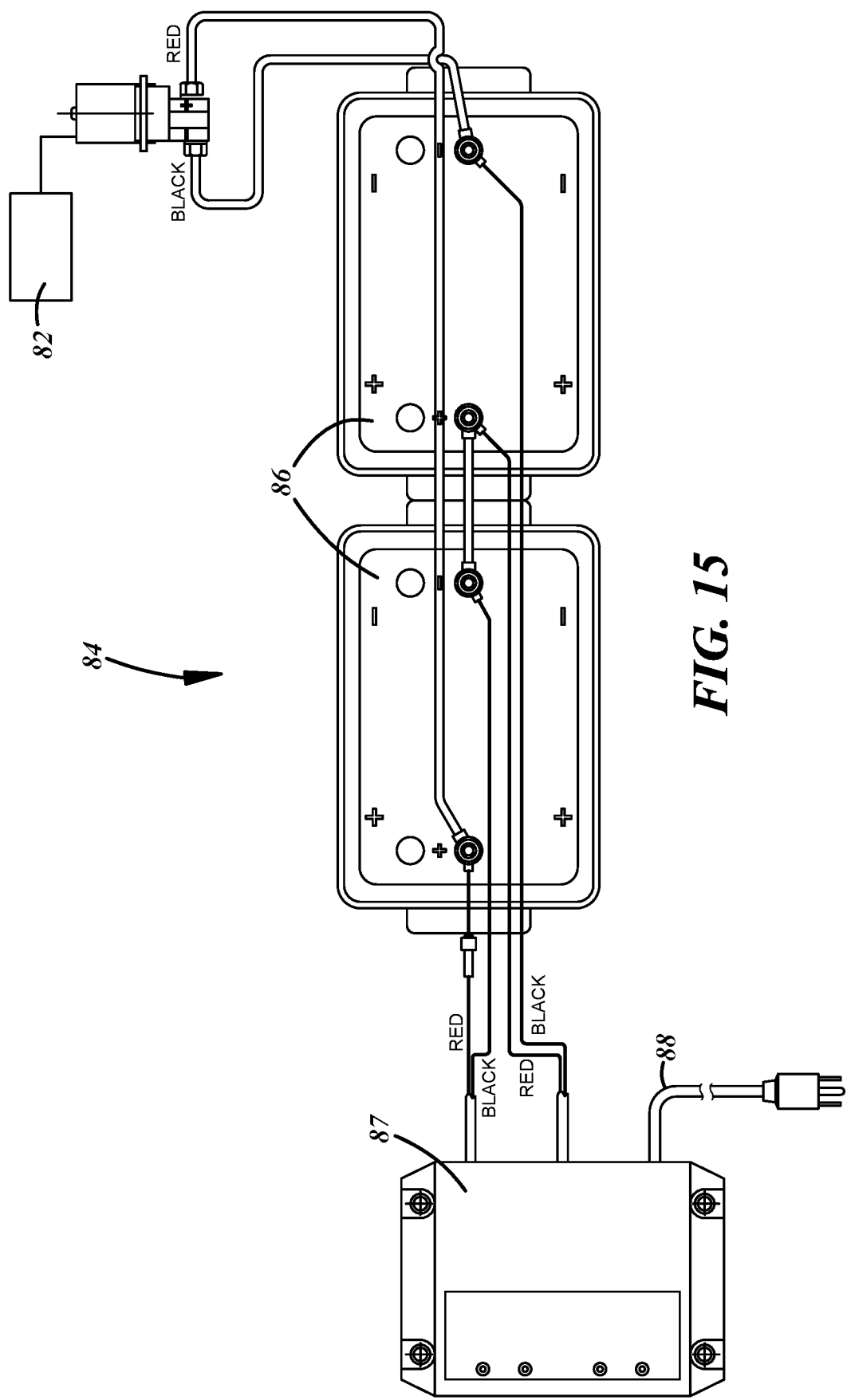
FIG. 15 is a schematic representation of an electrical system of the aft container attachment of the apparatus of FIG. 1.

As best shown in FIG. 15, the aft container attachment 16 may further include an electric power system 83 comprising an electric power supply 84 including one or more on-board batteries 86 connected to and actuable to provide electric power to the motorized hydraulic lift 82. The electric power system 83 of the aft container attachment 16 may also in include a battery charger unit 87 coupled with the on-board batteries 86 and including a connector 88 for connecting the charger unit 87 to a source of electrical power such as standard 120 VAC grid power.

As best shown in FIG. 7, the motorized hydraulic lift 82 of the aft container attachment 16 may include a forward pivot 90 comprising two coaxially aligned, spaced-apart pivot pins 92 pivotally connecting the aft attachment chassis 80 to the aft attachment frame 26 for pivotal motion about a generally horizontal forward pivot axis 94. As best shown in FIGS. 7, 8 and 15, the motorized hydraulic lift 82 may also include a hydraulic power pack 96 electrically connected to the electric power supply 84, in fluid communication with a hydraulic fluid circuit 98, and configured to convert electric power received from the electric power supply 84, into hydraulic fluid pressure in the hydraulic fluid circuit 98.

The motorized hydraulic lift 82 of the aft container attachment 16 may further include two hydraulic cylinders 100 mechanically connected between the aft attachment chassis 80 and frame 26 at respective locations spaced from the forward pivot axis 94, in fluid communication with the hydraulic fluid circuit 98. As best shown in FIG. 8, the cylinders 100 may be actuable, via hydraulic fluid routing through a hydraulic selector switch 102, to alternately extend to pivotally spread the aft attachment chassis 80 and frame 26 apart to a raised position, lifting the frame and a second end 20 of an attached intermodal container 22 as shown in FIG. 11, and to retract to pivotally move the aft attachment chassis 80 and frame 26 toward one another to a lowered position—lowering the frame and the second end 20 of an attached intermodal container 22 as shown in FIG. 10. An operator may actuate the hydraulic selector switch 102 to raise and lower the aft attachment frame 26 by pressing corresponding buttons on a hand-held control 103.

Figure 14:
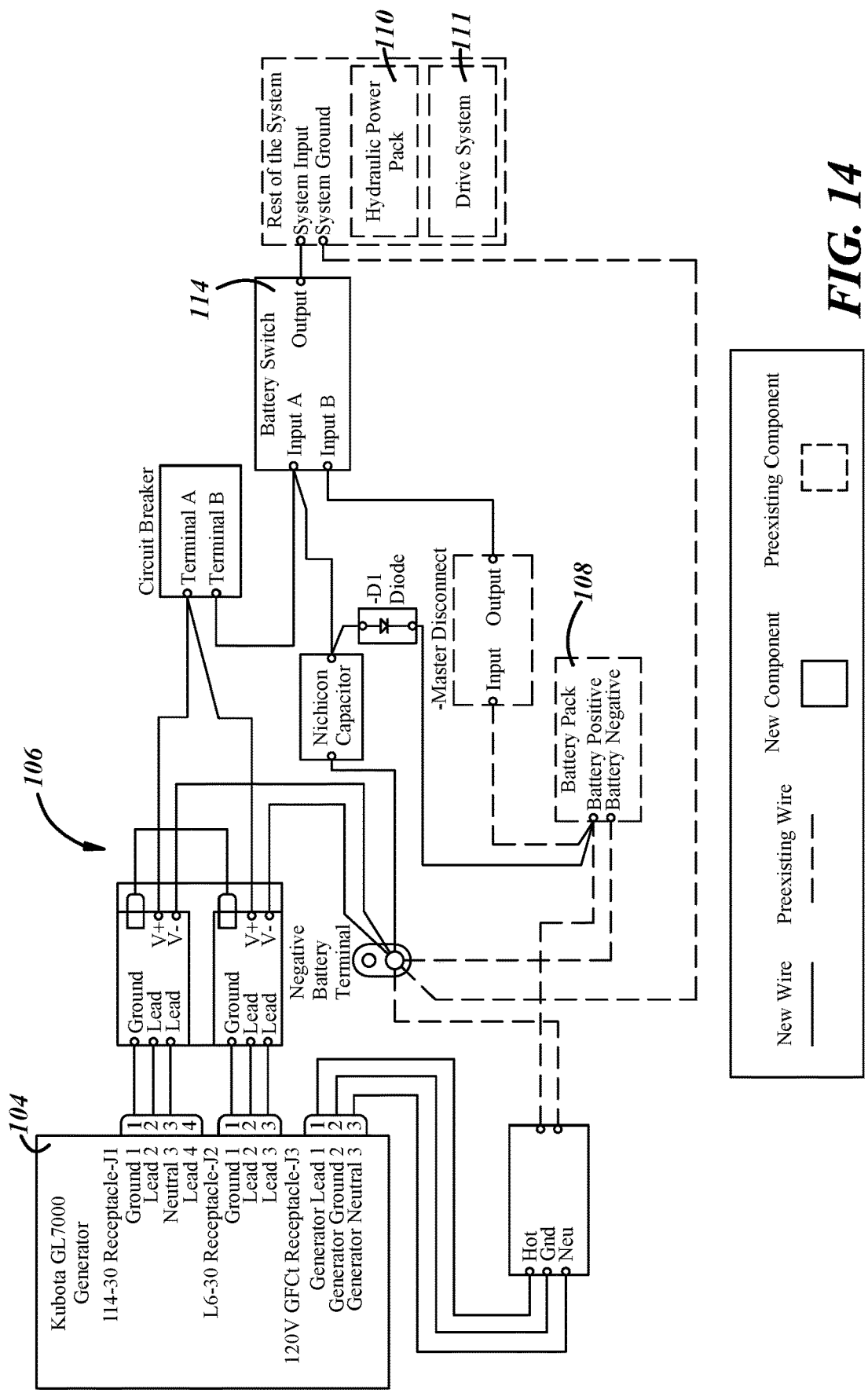
FIG. 14 is a schematic electrical block diagram showing an electrical system of the tow vehicle and forward container attachment of the apparatus of FIG. 1.

As shown in FIGS. 1-5, 10, 11, and 14, the apparatus 10 may optionally include an electrical generator 104 carried by the tow vehicle 12 and connected to an electrical power system 106 of the tow vehicle 12 to provide supplemental electrical power to charge an on-board battery pack 108 of the tow vehicle 12. As best shown in FIG. 14, the generator 104 may also, or alternatively, be used to directly power a hydraulic power pack 110 and/or drive system 111 of the tow vehicle 12.

As shown in FIG. 2, the generator 104 carried by the tow vehicle 12 may be connected via electric cables 112 to the electrical power system 83 of the aft container attachment 16 to charge its on-board batteries 86 and/or to provide electrical power to the hydraulic power pack 96 for the hydraulic power system of the aft container attachment 16.

As shown in FIG. 14, the apparatus 10 may include a power selector switch 114, which may be mounted on a control panel of the tow vehicle 12 and electrically connected between the tow vehicle on-board battery pack 108, the electrical generator 104, and/or the tow vehicle hydraulic power pack 110 and/or drive system 111 in such a way as to allow an operator to either shut-off power from the electrical generator 104 or to alternately direct electrical power from the generator 104 to the tow vehicle on-board battery 108 for charging or to the tow vehicle 12 to power the tow vehicle hydraulic power pack 110, and/or the tow vehicle drive system 111. Any suitable electrical generator may be used, including, for example, a diesel electric generator available from Kubota under the product designation GL7000.

Figure 16:
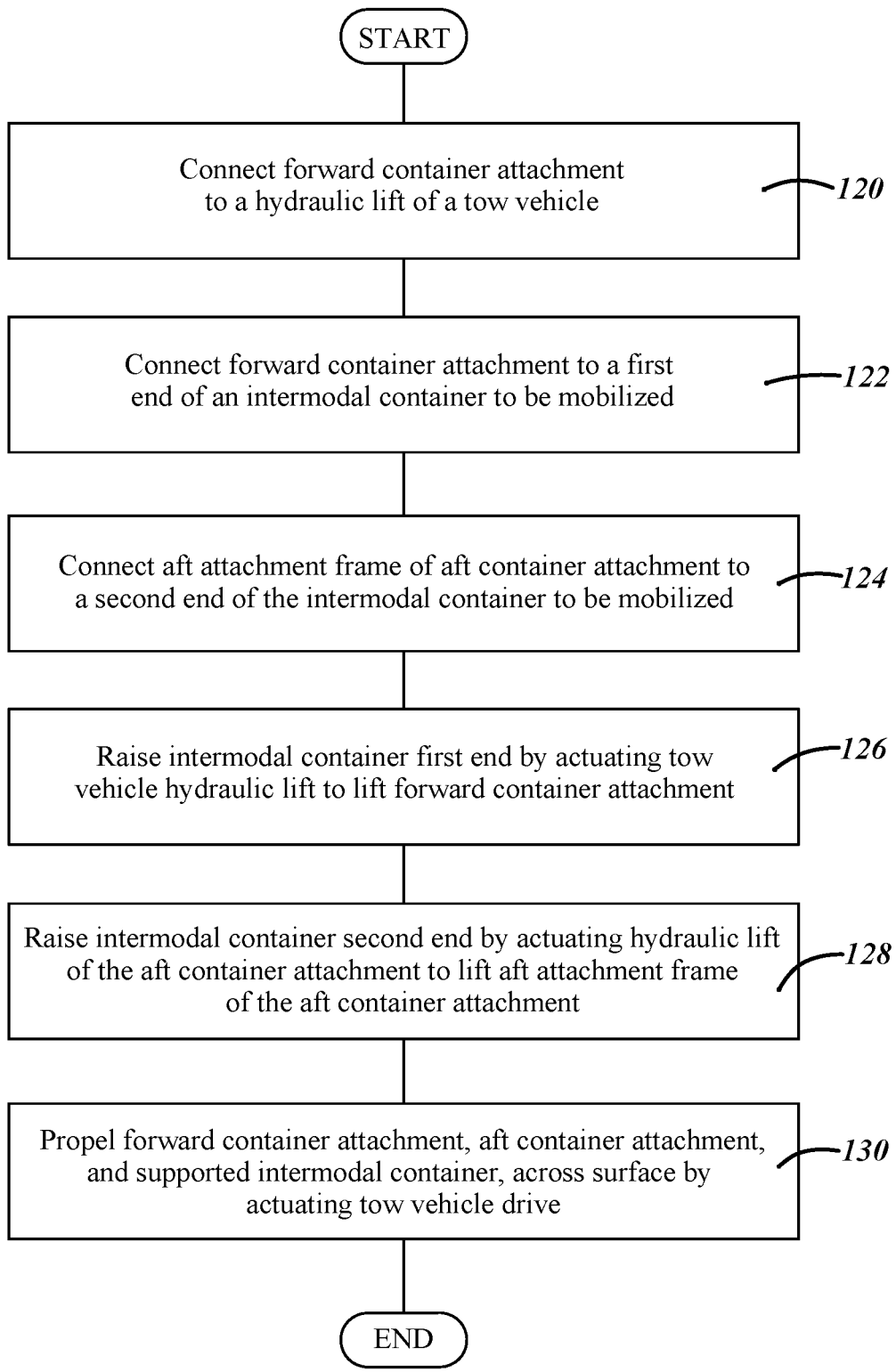
FIG. 16 is a flow chart showing a method of mobilizing an intermodal container for rolling transport using the apparatus of FIG. 1.

In practice, an intermodal container 22 may be mobilized by connecting the forward container attachment 14 to the hydraulic lift 60 of a tow vehicle 12, as shown in decision step 120 of FIG. 16, connecting the forward attachment frame 24 of the forward container attachment 14 to a first end 18 of an intermodal container 22 to be mobilized, as shown in decision step 122, then connecting the aft attachment frame 26 of the aft container attachment 16 to a second end 20 of the intermodal container 22 to be mobilized, as shown in decision step 124. The first end 18 of the intermodal container 22 may then be raised above a supporting surface by actuating the hydraulic lift 60 of the tow vehicle 12 to lift the forward container attachment 14, as shown in decision step 126 of FIG. 16, and the second end 20 of the intermodal container 22 may be raised above the supporting surface by actuating a hydraulic lift 82 of the aft container attachment 16 to lift the aft attachment frame 26 of the aft container attachment 16, as shown in decision step 128. A drive motor of the tow vehicle 12 may then be actuated to propel the forward container attachment 14, aft container attachment 16, and the supported intermodal container 22, across the supporting surface, as shown in decision step 130. Steps 120-128, above, may be executed in any order that will result in both the first and second ends 18, 20 of the intermodal container being raised above a supporting surface before step 130 is executed.

This description, rather than describing limitations of an invention, only illustrates an embodiment of the invention recited in the claims. The language of this description is therefore exclusively descriptive and is non-limiting.

Obviously, it's possible to modify this invention from what the description teaches. Within the scope of the claims, one may practice the invention other than as described above.

What is claimed is:

1. An intermodal container mobilizer apparatus comprising:
   a motorized trailer tug including a hydraulic lift for raising a first end of an intermodal container into a raised position;
   a forward container attachment including a forward attachment frame connectable between the hydraulic lift and the first end of the intermodal container in a position to support the first end of such a container in the raised position for rolling transport across a flat surface; an aft container attachment including an aft attachment frame connectable to a second end of the intermodal container, and including a back wheel supported on the aft container attachment for rotation about a back wheel rotational axis in a position to support the second end of such a container in a raised position for rolling transport across a flat surface;
   the forward container attachment further including:
      a pitch pivot connected between the forward attachment frame and the tug and configured to allow pivotal motion of the forward attachment frame relative to the tug about a generally horizontally-oriented pitch pivot axis disposed generally transverse to a longitudinal axis of the tug, with the apparatus supporting the first and second ends of the container for rolling transport in the respective raised positions; and
      a yaw pivot connected between the forward attachment frame and a tow mount of the forward container attachment, and also between the forward attachment frame and the pitch pivot, the yaw pivot being configured to allow lateral pivotal motion of the forward attachment frame relative to the tow mount about a generally vertically-oriented axis;
      the hydraulic lift being configured to raise and lower the forward attachment frame without requiring rotation of the tug relative to the forward attachment frame about the pitch pivot axis.

2. The intermodal container mobilizer apparatus of claim 1, further including twist lock pins having respective oblong heads removably insertable through and twistable into engagement with:
   oblong pin receiver holes in the forward attachment frame and correspondingly-positioned and shaped oblong pin receiver holes in the first end of an intermodal container; and
   oblong pin receiver holes in the aft attachment frame and correspondingly-positioned and shaped oblong pin receiver holes in the second end of an intermodal container.

3. The intermodal container mobilizer apparatus of claim 1 in which the aft attachment frame is connectable to the forward attachment frame for rolling transport of the aft container attachment with the tug.

4. The intermodal container mobilizer apparatus of claim 1 in which the aft container attachment includes a caster jack carried by the aft attachment frame in a position spaced forward of the back wheel rotational axis, the caster jack comprising:
   a caster wheel; and
   a jack that is carried by the aft attachment frame and supports the caster wheel for swiveling motion about a generally vertical swivel axis and is actuable to move the caster wheel between a retracted up position and an extended down position.

5. The intermodal container mobilizer apparatus of claim 1 in which the pitch pivot has a pivotal range of motion sufficient to allow the apparatus to roll an ISO-standard sized intermodal container across an inside corner formed where an aft cargo ramp of a C-17 aircraft meets a generally level ground surface, and across an outside corner formed where the aft cargo ramp meets a cargo deck of the C-17 aircraft.

6. The intermodal container mobilizer apparatus of claim 1 in which the forward container attachment is connectable to the hydraulic lift of the tug such that the forward container attachment is alternately raised and lowered via actuation of the hydraulic lift of the tug.

7. The intermodal container mobilizer apparatus of claim 1, further comprising an electrical generator carried by the tug and connected to an electrical power system of the tug.

8. The intermodal container mobilizer apparatus of claim 1 in which the aft container attachment comprises:
   an aft attachment chassis supported on the back wheel and carrying the aft attachment frame;
   a motorized hydraulic lift actuable to alternately raise and lower the aft attachment frame relative to the back wheel; and
   an electric power supply connected to and actuable to provide electric power to the motorized hydraulic lift.

9. The intermodal container mobilizer apparatus of claim 8 in which the hydraulic lift of the aft container attachment comprises:
   a forward pivot pivotally connecting the aft attachment chassis to the aft attachment frame for pivotal motion about a forward pivot axis;
   a hydraulic power pack electrically connected to the electric power supply, in fluid communication with a hydraulic fluid circuit, and configured to convert electric power received from the electric power supply, into hydraulic fluid pressure in the hydraulic fluid circuit; and
   a hydraulic cylinder mechanically connected between the aft attachment chassis and the aft attachment frame at a location spaced from the forward pivot axis, in fluid communication with the hydraulic fluid circuit, and actuable to alternately extend to pivotally spread the aft attachment chassis and frame apart to a raised position and to retract to pivotally move the aft attachment chassis and frame toward one another to a lowered position.

10. A method for mobilizing an intermodal container, the method comprising the steps of: connecting a first end of an intermodal container to be mobilized, to a forward attachment frame of a forward container attachment carried by a trailer tug, the forward container attachment comprising:
   a pitch pivot connected between the forward attachment frame and the tug and including a generally horizontally-oriented pitch pivot axis disposed generally transverse to a longitudinal axis of the tug, and
   a yaw pivot connected between the forward attachment frame and the tug, and also between the forward attachment frame and the pitch pivot, and including a generally vertically-oriented yaw pivot axis;
   connecting an aft attachment frame of an aft container attachment to a second end of the intermodal container to be mobilized, the aft container attachment including a back wheel supported for rotation about a back wheel rotational axis and resting on a surface across which the intermodal container is to be transported;
   raising the first end of the intermodal container to a raised position for rolling transport, by actuating a hydraulic lift of the tug to lift the forward container attachment without requiring rotation of the tug relative to the forward attachment frame about the pitch pivot axis;

raising the second end of the intermodal container to a raised position for rolling transport, by actuating a hydraulic lift of the aft container attachment to lift the aft attachment frame of the aft container attachment; and actuating the tug to propel the forward container attachment, aft container attachment, and the supported intermodal container, across the surface while allowing pivotal motion of the forward attachment frame relative to the tug about the pitch pivot axis, and lateral pivotal motion of the forward attachment frame relative to the tug about the yaw pivot axis while under way.

\* \* \* \* \*